(12) United States Patent
Albornoz

(10) Patent No.: US 7,860,970 B2
(45) Date of Patent: *Dec. 28, 2010

(54) SECURE INITIALIZATION OF INTRUSION DETECTION SYSTEM

(75) Inventor: Jordi A. Albornoz, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/330,001

(22) Filed: Dec. 8, 2008

(65) Prior Publication Data

US 2009/0126021 A1    May 14, 2009

Related U.S. Application Data

(63) Continuation of application No. 10/686,156, filed on Oct. 15, 2003, now Pat. No. 7,464,158.

(51) Int. Cl.
  *G06F 15/173* (2006.01)

(52) U.S. Cl. .......................... 709/224; 726/23; 713/155

(58) Field of Classification Search ................ 709/224; 726/23, 5; 713/201, 155; 705/51
See application file for complete search history.

(56) References Cited

U.S. PATENT DOCUMENTS

| | | | |
|---|---|---|---|
| 5,278,901 A | 1/1994 | Shieh et al. | |
| 5,557,742 A | 9/1996 | Smaha et al. | |
| 5,621,889 A | 4/1997 | Lermuzeaux et al. | |
| 5,721,780 A | 2/1998 | Ensor et al. | |
| 5,958,051 A | 9/1999 | Renaud et al. | |
| 6,279,113 B1* | 8/2001 | Vaidya | 726/23 |
| 6,314,409 B2 | 11/2001 | Schneck et al. | |
| 6,363,489 B1 | 3/2002 | Comay et al. | |
| 6,370,648 B1* | 4/2002 | Diep | 726/22 |
| 6,405,318 B1* | 6/2002 | Rowland | 726/22 |
| 6,460,141 B1 | 10/2002 | Olden | |

(Continued)

FOREIGN PATENT DOCUMENTS

WO    WO 00/54458    9/2000

OTHER PUBLICATIONS

Bauer, Dennis C.; Cannady, James; Garcia, Raymond C., "Detecting Anomalous Behavior: Optimization of Network Traffic Parameters Via An Evolution Strategy," 0/7803-6748-0/01, IEEE 2001, pp. 34-39.

*Primary Examiner*—Jungwon Chang
(74) *Attorney, Agent, or Firm*—Jose Gutman; Fleit Gibbons Gutman Bongini & Bianco PL

(57) ABSTRACT

Secure initialization for detecting intrusions is disclosed. The secure initialization includes storing a behavior profile associated with an application, and reading the stored behavior profile that is cryptographically protected. The method further includes monitoring execution of the application during a bootstrapping phase of an intrusion detection system, according to the stored behavior profile. If the behavior of the application does not conform to the behavior profile, a message is issued indicating that the application is not conforming to the behavior profile. The behavior profile can be generated by a developer of the intrusion detection system, a developer of the application, and/or a third party developer. Additionally, the behavior profile is generated by executing the system on a reference computer system or by heuristic determination.

18 Claims, 8 Drawing Sheets

U.S. PATENT DOCUMENTS

| | | | |
|---|---|---|---|
| 6,681,331 B1 * | 1/2004 | Munson et al. | 726/23 |
| 6,769,066 B1 * | 7/2004 | Botros et al. | 726/23 |
| 7,085,936 B1 * | 8/2006 | Moran | 726/5 |
| 7,133,845 B1 * | 11/2006 | Ginter et al. | 705/51 |
| 7,181,768 B1 * | 2/2007 | Ghosh et al. | 726/23 |
| 7,464,158 B2 * | 12/2008 | Albornoz | 709/224 |
| 7,500,266 B1 * | 3/2009 | Vukelich et al. | 726/23 |
| 2004/0230834 A1 * | 11/2004 | McCallam | 713/201 |

* cited by examiner

APPLICATION A
(System Calls)

- read, write, read, stat
- open, read, getrlimit, close
- mmap, mmap, open, write

SECURE INITIALIZATION OF INTRUSION DETECTION SYSTEM

CROSS-REFERENCE TO RELATED APPLICATION

This application is a continuation of U.S. patent application Ser. No. 10/686,156 entitled "SECURE INITIALIZATION OF INTRUSION DETECTION SYSTEM" filed on Oct. 15, 2003, now U.S. Pat. No. 7,464,158, which is assigned to the same assignee as this application and the teachings of which are hereby incorporated by reference.

BACKGROUND OF THE INVENTION

1. Field of the Invention

This invention generally relates to the field of computer security and more specifically to secure initialization of a computer intrusion detection system.

2. Description of Related Art

For over two decades, consumers have been using computers to conduct business, organize their lives and access information. Further, users today use the Web to do their banking, make stock trades, review their personal medical information and perform other tasks involving sensitive data. As the popularity of the Internet increases, consumers are increasingly maintaining network connectivity. In order to protect consumers' sensitive data, computer intrusion detection systems have risen in popularity as a way to protect confidential information.

Typically, anomaly-based intrusion detection systems are least reliable and most vulnerable during the initial stages of their deployment, i.e., the bootstrapping stage. In this stage, the intrusion detection system typically has to monitor the behavior of a computer system to learn what activities are normal for the system. Once the intrusion detection system (IDS) learns the normal behavior of the computer system, the IDS can identify deviations from that normal behavior that might signal intrusions. The IDS is often unreliable during bootstrapping because it yields a high rate of false positives. Many systems even suppress alarms during the learning period since they are so unreliable. Also, the IDS is vulnerable to mistakenly treating an intrusion as normal behavior if the system has been compromised prior to the bootstrapping phase of the IDS. If an IDS treats an intrusion as normal behavior, then it will be blind to that intrusion and will allow it to continue undetected.

The problem with current solutions to intrusion detection is that they use methods that either do not reduce false positives effectively or introduce trust requirements that are unnecessary. One solution is to suppress false alarms during an initial training phase on the monitored computer system. However, this basically means the computer system is not protected during the bootstrapping phase. Such a solution amounts to simply ignoring the problem rather than solving it. Another solution is to quarantine the protected computer system during the bootstrapping phase. This solution attempts to prevent the IDS from learning from a compromised computer system. However, it is often difficult and costly to quarantine a computer system. Also, the quarantined environment usually deviates significantly from the computer system's production environment. Thus, any learning that the IDS achieves during such a quarantine is of limited usability and the false alarm rate may remain high once the computer system is placed into production. Further, the quarantine method requires trusting the quarantine, which introduces another obstacle.

Therefore a need exists to overcome the problems discussed above, and particularly for a way to more securely bootstrap intrusion detection systems.

SUMMARY OF THE INVENTION

Briefly, in accordance with the present invention, disclosed is a system, method and computer readable medium for detecting intrusions. In a preferred embodiment of the present invention, the method on a computer includes receiving a behavior profile associated with an application and reading the behavior profile associated with the application. The method further includes monitoring execution of the application, according to the behavior profile. If the behavior of the application does not conform to the behavior profile, a message is issued indicating that the application is not conforming to the behavior profile. In an embodiment of the present invention, the behavior profile is generated by a developer of the intrusion detection system, a developer of the application or a third party developer. Additionally, the behavior profile is generated by executing the system on a reference computer system or by heuristic determination.

In another embodiment of the present invention, if the behavior of the application does not conform to the behavior profile, then a log file describing how the application is not conforming to the behavior profile is generated. Alternatively, if the behavior of the application does not conform to the behavior profile, then the application that is not conforming to the behavior profile is discontinued or forcibly quit. In another alternative, if the behavior of the application does not conform to the behavior profile, then the user is prompted to determine whether to quit the application that is not conforming to the behavior profile.

Also disclosed is a computer system for detecting intrusions. The computer system includes an application and a behavior profile associated with the application. The computer system further includes a monitor for monitoring execution of the application, according to the behavior profile and a warning module for issuing a message indicating that the application is not conforming to the behavior profile. In another embodiment of the present invention, the behavior profile is generated by a developer of the intrusion detection system, a developer of the application or a third party developer.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 5 is an illustration of an entry in a normal behavior profile in the profile database, according to an embodiment of the present invention.

DESCRIPTION OF THE PREFERRED EMBODIMENTS

Introduction

The present invention, according to a preferred embodiment, overcomes problems with the prior art by providing an efficient and easy-to-implement method for securely bootstrapping an intrusion detection system.

The embodiments of the present invention reduce false alarms in anomaly-based intrusion detection systems during the initial setup (i.e., the bootstrapping phase) or after a significant change to the protected computer system. The present invention includes one or more "normal behavior profiles" associated with all software packages or applications. These profiles are used during the bootstrap phase of the anomaly-based intrusion detection system (IDS). This reduces false alarms during the initial learning stage of the anomaly-based intrusion detection system and also reduces the chances of the intrusion detection system "learning" data that includes intrusions.

The normal behavior profiles contain measurements and audit data that model the common behavior of a particular software application in the absence of intrusions. An anomaly-based IDS will then use the profile to initialize itself. The IDS will use the profile as a baseline of behavior to guide further learning or normal behavior in a particular environment. Using the profile, the IDS no longer starts from a blank slate. Instead, the profile gives the IDS an idea of normal behavior. The IDS may then begin to yield reliable judgments in looking for intrusions much sooner than if it would have started without any knowledge of the software application's normal behavior. False alarms are thus reduced and the IDS system's judgments can be considered more reliable than they would have been without the use of the profile during bootstrapping.

If the IDS were to start from a blank slate, all behavior would appear anomalous during the bootstrapping phase, thus any alarm raised would likely be false and any real intrusions would be missed. Without a profile, the IDS does not start with a sane baseline for normal behavior and it becomes likely that any intrusion already in the system will be incorrectly learned and subsequently treated as normal. Thus such an intrusion will subsequently go unnoticed by the IDS.

Overview of the Intrusion Detection System

Figure 1:
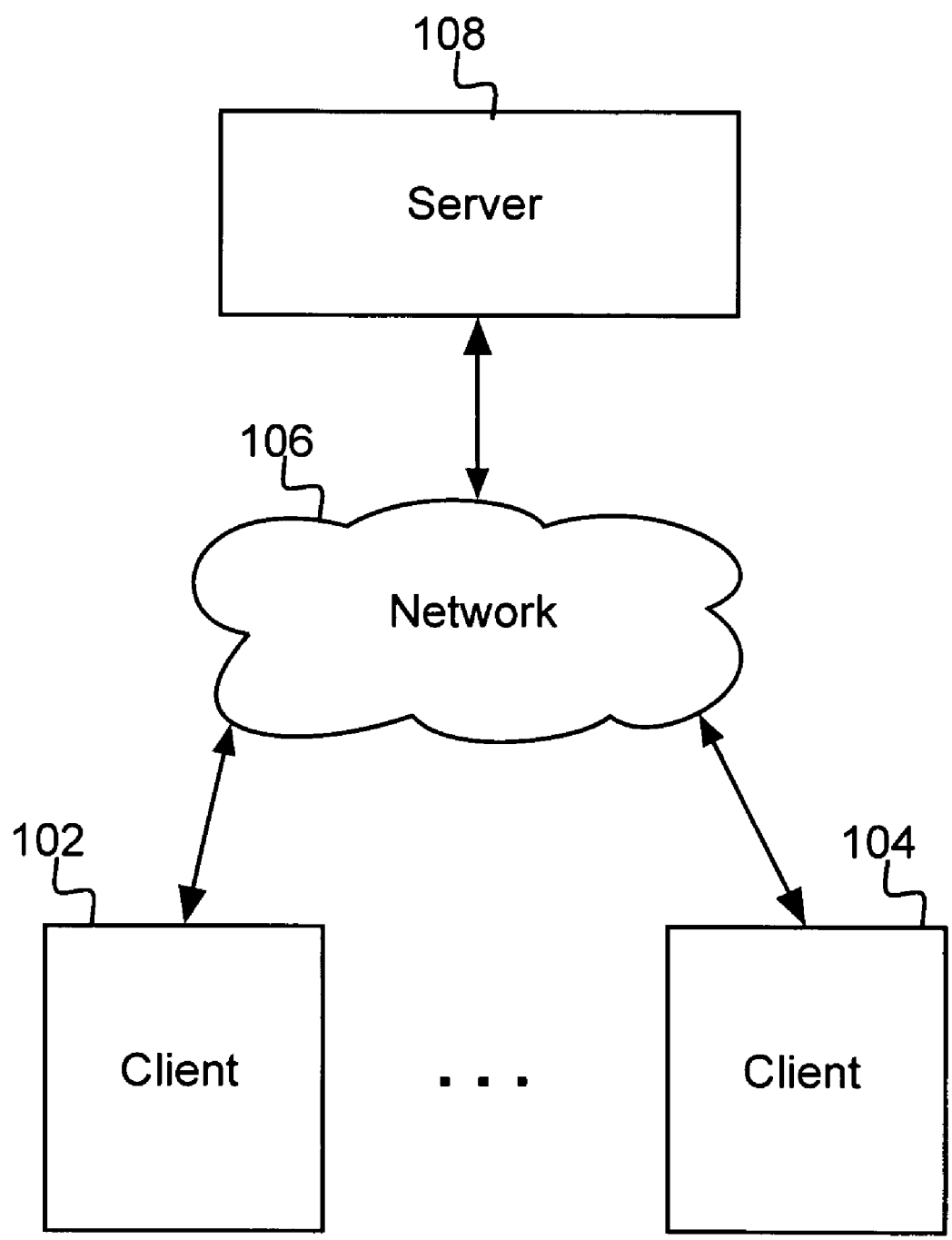
FIG. 1 is a block diagram illustrating an exemplary overall system architecture of a computer network suitable for use with an embodiment of the present invention.

FIG. 1 is a block diagram illustrating an exemplary system architecture of a computer network suitable for use with an embodiment of the present invention. The exemplary embodiments of the present invention will be discussed with reference to the exemplary system architecture of FIG. 1.

FIG. 1 shows client computers 102 and 104, on which an intrusion detection system can be located. FIG. 1 also shows server 108, which is any commercially available server system that allows client computers 102 through 104 to exist in a client-server relationship with the server 108. The intrusion detection system of the present invention can also be located on the server 108.

In an embodiment of the present invention, the computer systems of client computers 102 through 104 and server 108 are one or more Personal Computers (PCs) (e.g., IBM or compatible PC workstations running the Microsoft Windows operating system, Macintosh computers running the Mac OS operating system, or equivalent), Personal Digital Assistants (PDAs), hand held computers, palm top computers, smart phones, game consoles or any other information processing devices. In another embodiment, the computer system of server 108 is a server system (e.g., SUN Ultra workstations running the SunOS operating system or IBM RS/6000 workstations and servers running the AIX operating system). The computer systems of client computers 102 through 104 and server 108 are described in greater detail below with reference to FIG. 8.

In an embodiment of the present invention, the network 106 is a circuit switched network, such as the Public Service Telephone Network (PSTN). In another embodiment, the network is a packet switched network. The packet switched network is a wide area network (WAN), such as the global Internet, a private WAN, a local area network (LAN), a telecommunications network or any combination of the above-mentioned networks. In yet another embodiment, the network is a wired network, a wireless network, a broadcast network or a point-to-point network.

Figure 2:
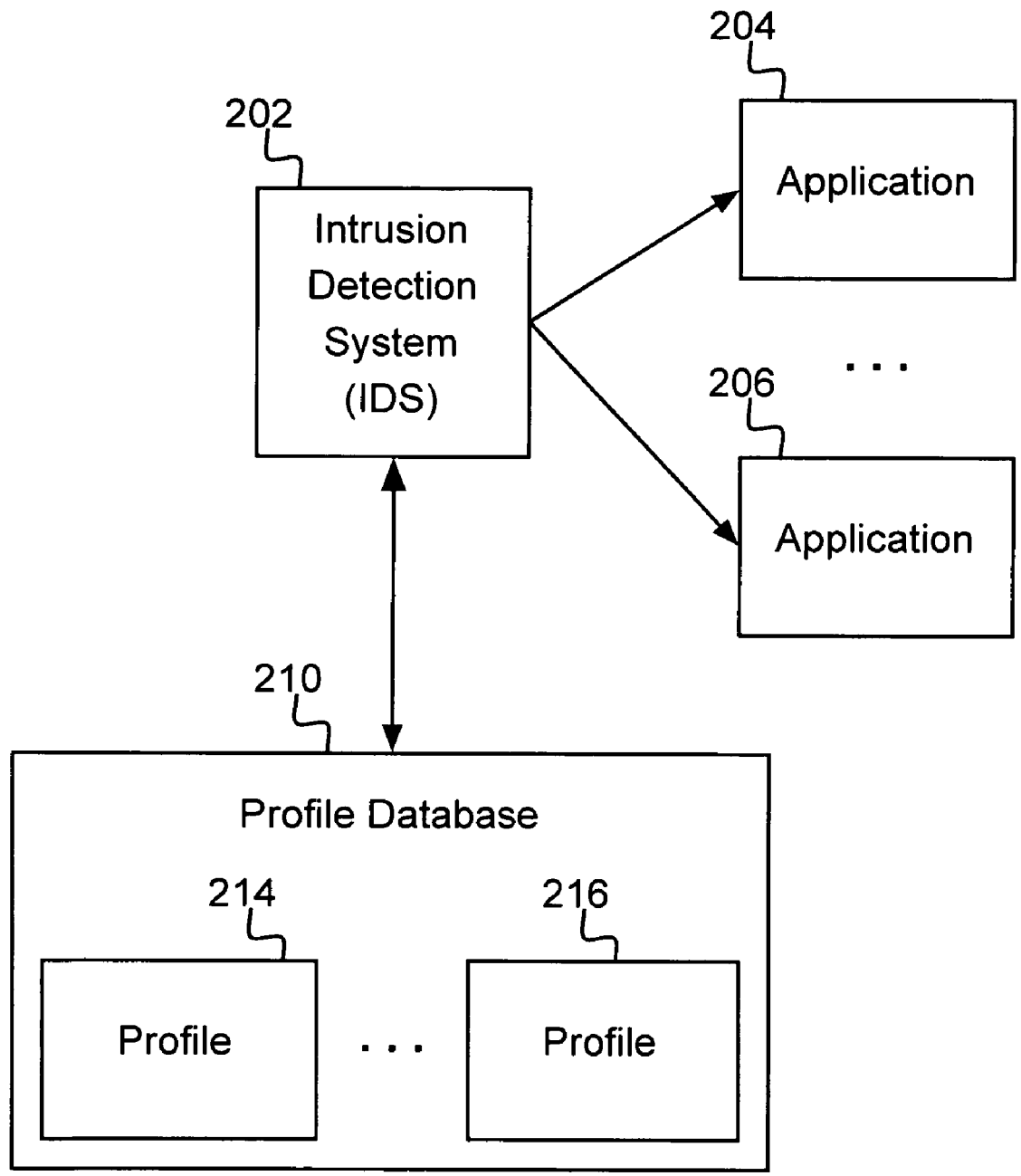
FIG. 2 is a detailed block diagram of a system according to an embodiment of the present invention.

FIG. 2 is a detailed block diagram illustrating a system according to an embodiment of the present invention. FIG. 2 shows applications 204 through 206. Each of the applications 204 through 206 can be any available computer application, such as a database interface, a spreadsheet program or other financial software. FIG. 2 also shows a set of profiles 214 through 216. Each of the profiles 214 through 216 corresponds to an application 204 through 206. A profile refers to a normal behavior profile that describes the normal operations of an application. A profile describes those actions and tasks that are acceptable for an application to perform. A profile can contain such information as a list of system commands, a list of file permissions, a list of directory permissions, a list of network messages and a login attempt summary. Profiles are their contents are described in greater detail below.

FIG. 2 further shows the profile database 210, which is a repository used for the storage of profiles 214 through 216. FIG. 2 also shows an intrusion detection system (IDS) 202. The IDS 202 is the main operating module of the present invention. The IDS 202 facilitates the reception and reading of profiles 214-216 corresponding to applications 204-206. The IDS 202 further facilitates the monitoring of the applications 204-206 according to profiles 214-216. The functions of IDS 202 are described in greater detail below.

In an embodiment of the present invention, all of the elements and modules of the system of FIG. 2 are located on one client computer, such as client computer 102 or client computer 104. In an embodiment of the present invention, all of the elements and modules of the system of FIG. 2 are located on one client computer, except that the database 210 would preferably be located on another computer or server. In this embodiment as shown in FIG. 2, elements 202 and 204-206 are located on one client computer, such as client computer 102, while the database 210 would be located on server 108 or client computer 104. During the execution of the IDS 202, information would be retrieved from the database 210, as required by the IDS 202.

This embodiment advantageously allows for the use of the present invention in a distributed computing environment. This paradigm allows the IDS 202 to float among devices on a network and retain its functionality while operating on different devices. This is also advantageous because it allows for the remote storage and/or backup of the database 210. This is beneficial as it allows for more than one copy of the database 210 to exist on the network, which reduces the possibility of information loss in the event of a system crash or other disaster. In an embodiment of the present invention, the database 210 is encrypted so as to secure the information stored within it.

The Normal Behavior Profile

In an embodiment of the invention, the normal behavior profile for a particular software package, or application, is created by the software package manufacturer or by the manufacturer of the anomaly-based intrusion detection system (IDS). A user of the IDS is already placing trust in the IDS properly understanding normal versus suspicious behavior, thus having the IDS manufacturer provide normal behavior profiles avoids introducing another party to be trusted. The profiles may simply be considered part of the IDS itself. This is treating the normal behavior profiles much like the virus signature files used by modern virus scanners.

This method is very useful when the IDS monitors systems in such a manner as to encompass multiple software packages in the measurements it observes. For instance, network intrusion detection systems may monitor multiple computers and not be as fine-grained as observing the behavior of particular applications. Thus, profiles might be created for "a home network", a "departmental network", or a "production backbone", etc.

Another creation methodology is for the software manufacturer to provide the profiles for software they create. This method has the advantage of coverage. The sheer number of software packages available places a significant burden on an IDS manufacturer if they attempt the task of developing profiles for all available software packages. Thus, it is also preferable that the software manufacturers create and distribute normal profiles for software they create. This alternate methodology also has the advantage of not introducing another party to trust. The user already trusts the software manufacturer to provide reliable behavior that will not cause ill affects on the system on which it runs. The behavior profile can simply be considered part of the software package itself.

In another embodiment of the invention, a third party may develop the normal user profiles. This adds another party to be trusted in the system because the profiles are being used by the IDS to learn normal behavior. If the profiles were to contain malicious data, the IDS could be trained to mistakenly treat particular intrusions as normal behavior, thus blinding the system to a particular intrusion. However, the same benefits may be obtained from the invention given that the party providing the normal behavior profiles is trusted.

Regardless of the particular party charged with the creation of the normal behavior profiles, the actual creation of the profiles can be achieved by a number of different methods. In one embodiment, the normal behavior profiles are created by monitoring live execution of the software package for which the profile is being created.

Once a software package has been completed, an installation of the software is monitored for the audit data and measurements that are to be included in the profile. The installation should be performed in a secure environment with care being taken to ensure that the profile will not include any intrusions. Depending on the nature of a software package, achieving a secure environment may be difficult if the behavior being observed is to be close to normal behavior. Care must be taken to make reasonable trade-offs between certainty that no intrusions exist in the data and assurance that real-world behavior is being observed.

The effectiveness of the profile in reducing false alarms is directly related to how close the profile models real-world behavior. The effectiveness in reducing false negatives is directly related to how few intrusions exist in the profile creation. Additional care must be taken for software packages that exhibit significantly different behavior depending on environment. For example, a web server is software that will behave differently if it is used to share photos by a home user than when it is used for a secure banking front end. The bank will see hundreds of calls to authentication functionality including many authentication failures while the home user will see very little such behavior. If a profile includes such information about the usage of authentication functionality, then, depending on the environment of the system used to create the profile, it may be more effective for either the home user or the bank.

To improve effectiveness, a software manufacturer may provide multiple profiles along with their applications and give the user the choice of profile to install. The likelihood of such a situation occurring depends heavily on the particular data being included in the normal behavior profile. For example, it is likely that if the profile includes data about the number of network operations per second, then a web server profile is highly sensitive to its executing environment.

The data that is included in the profile is determined mainly by the IDS for which the profile is being targeted. Given that many anomaly-based IDS systems exist today and each uses different data for monitoring a system, it is likely that many different formats for normal behavior profiles may be defined. For this reason, in one embodiment, a software manufacturer would choose the particular IDS systems that it will support. It will then create profiles for each of those IDS systems in their specified format including the data required by each.

For example, one existing IDS observes mainly the list of system function calls being performed by a software application while another existing IDS system uses other information such as the time of day functions are being used. The data included in the profile is determined by the information that the consuming IDS observes in making its judgments. In another embodiment of the invention, there may exist a single normal behavior profile format that is supported by multiple intrusion detection systems. Normal behavior profiles may also contain either more or less information than is actually used by the consuming IDS. A profile would contain less information than the IDS uses when the profile does not want to provide misleading data for a particular factor that is heavily environment dependent. This is another way to deal with the high variability as described by the web server example above. A profile would contain more information than used by the consuming IDS in the case where a profile might support multiple different IDS systems or different modes of an IDS. Thus the extra data would be intended for usage but all the profile data need not be used by a single IDS.

In another embodiment of the present invention, the normal behavior profiles are distributed in a secure manner. Typically, secure distribution methods involve using digital signatures to ensure the identity of the author and ensure that the profiles are free from tampering. The distribution method that is used to distribute the software package itself or the IDS itself is sufficient. For instance, common physical methods of distribution such as marked shrink-wrapped physical media may also be considered sufficient for secure distribution.

The consumption of the normal behavior profile is performed by an IDS during its bootstrapping phase. The bootstrapping phase is the phase in which the system must learn the normal behavior of the system without having sufficient prior knowledge of behavior. Thus, bootstrapping typically occurs both when an IDS is first executed on a particular system as well as when the monitored system is significantly modified. For instance, installing a new piece of software on a monitored system would have the IDS consume the normal behavior profile for the newly installed application. An IDS consumes a normal behavior profile by treating it exactly as it would behavior it had actually observed while running. For example, this may mean initializing a neural network based on constants provided in the profile or priming audit log databases with data from the profile.

Operation of the Intrusion Detection System

Figure 3:
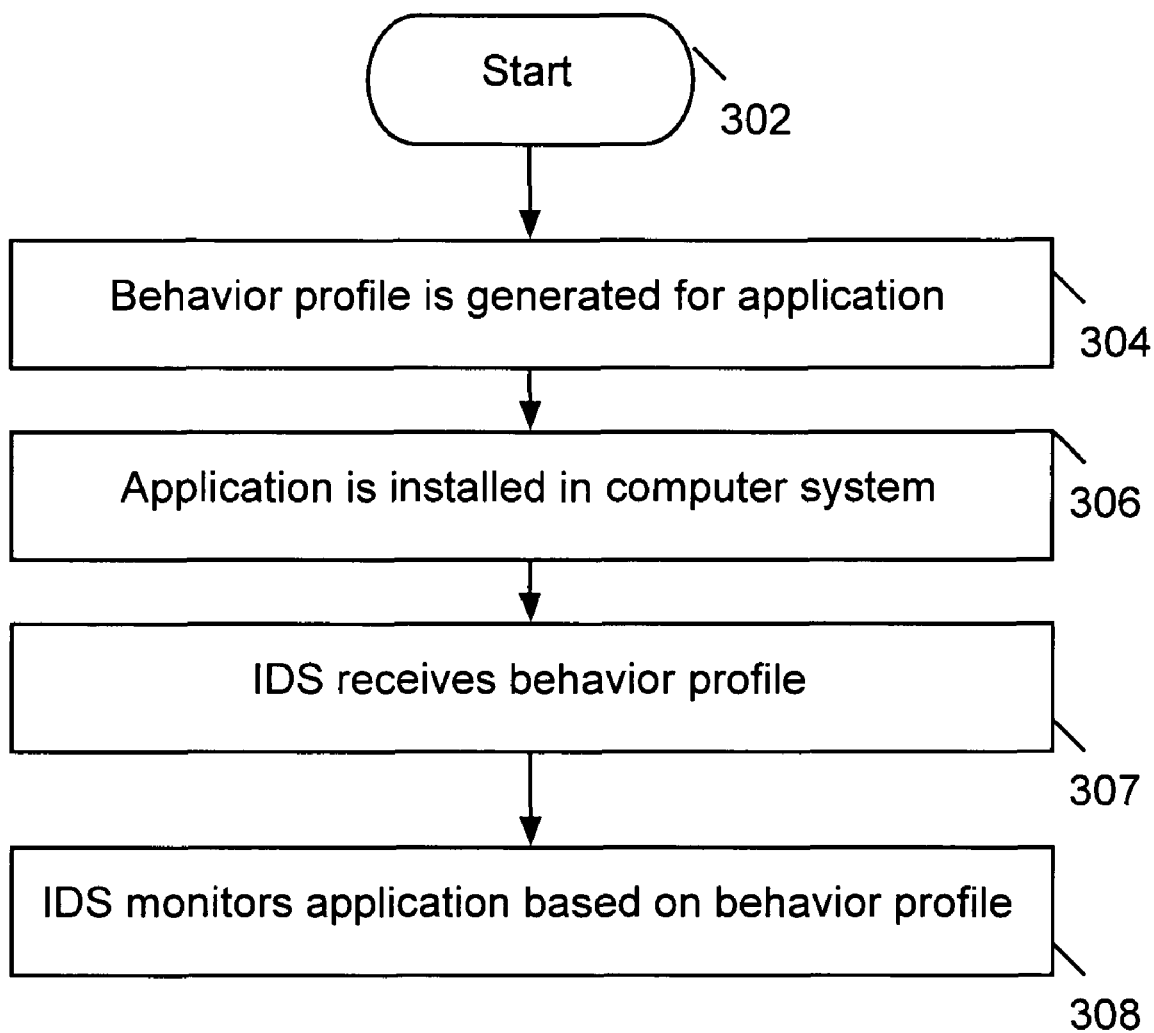
FIG. 3 is a flowchart depicting the overall operation and control flow of one embodiment of the present invention.

FIG. 3 is a flowchart depicting the overall operation and control flow of one embodiment of the present invention. The operation and control flow of FIG. 3 depicts the overall processes of the present invention. The operation and control flow of FIG. 3 begins with step 302 and proceeds directly to step 304.

In step 304, a behavior profile is generated for an application, such as application 204. Behavior profiles are described in greater detail above and below with reference to FIG. 4. In step 306, the application 204 is installed on a client computer, such as computer 102, having the IDS 202 already present. In step 307, the IDS 202 receives the behavior profile, such as profile 214, corresponding to the application 204. Methods for creating and distributing behavior profiles are described in greater detail above. In step 308, the IDS 202 proceeds to monitor the application 204 according to the behavior profile 214. The manner in which the IDS 202 monitors the application 204 is described in greater detail below with reference to FIG. 7.

Figure 4:
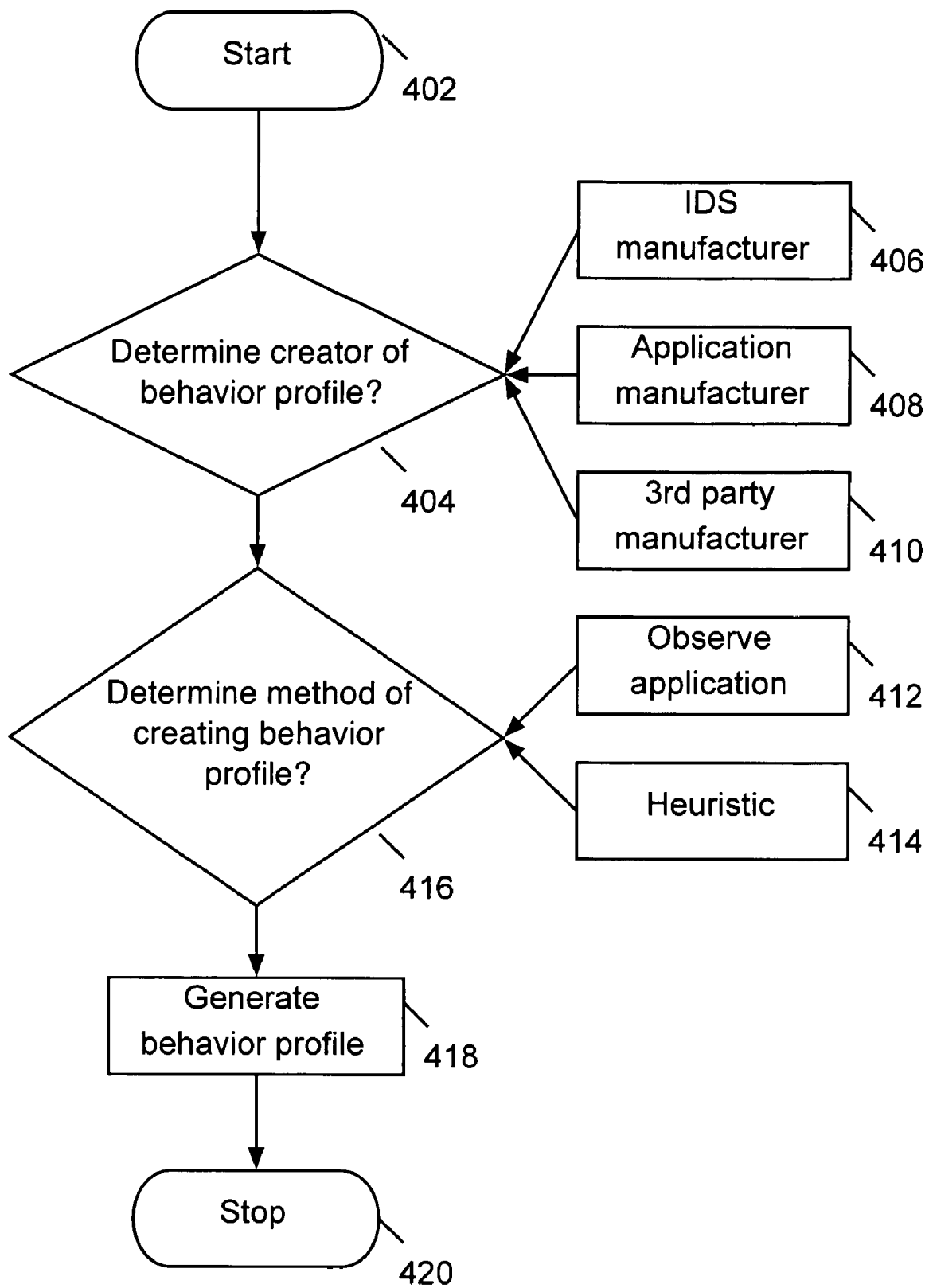
FIG. 4 is a flowchart depicting the operation and control flow of the behavior profile creation process of one embodiment of the present invention.

FIG. 4 is a flowchart depicting the operation and control flow of the profile creation process of one embodiment of the present invention. The operation and control flow of FIG. 4 provides more detail with regards to step 304 of FIG. 3. The operation and control flow of FIG. 4 begins with step 402 and proceeds directly to step 404.

In step 404, the creator of the behavior profile is determined. As explained above, the creator of a behavior profile can be the IDS manufacturer 406, the application manufacturer 408 or a third party manufacturer 410. Each of the above manufacturers are described in greater detail above. Subsequent to determining the creator of the profile, in step 416, the method of creating the behavior profile is determined. As explained above, the behavior profile can be generated in a variety of ways.

One way to generate a behavior profile, shown in item 412, includes the execution of the application on a reference system and the observation of the application in order to generate the profile based on the application's operations on the reference system. This is described in greater detail above. Another way to generate a behavior profile, shown in item 414, includes the heuristic derivation of the application's operations in order to generate the profile based on such an algorithm. This is also described in greater detail above.

In step 418, the behavior profile is generated. In step 420, the control flow of FIG. 4 stops.

FIG. 5 is an illustration of an entry in a normal behavior profile in the profile database, in one embodiment of the present invention. FIG. 5 shows a behavior profile 502, similar to profile 214 of FIG. 2, for entry into behavior profile database 210. Note that the profile 502 corresponds to a particular application, i.e., "Application A." Also note that the profile 502 includes an exemplary sequence of system calls that have been determined, during profile creation, to be a normal sequence of functions for the particular application. The exemplary sequence of system calls of 502 are garnered from *A sense of self for Unix processes*, S. Forrest, S. A. Hofmeyr, A. Somayaji, and T. A. Longstaff, Proceedings of the 1996 IEEE Symposium on Security and Privacy, pages 120-128, IEEE Computer Society Press 1996.

Figure 6:
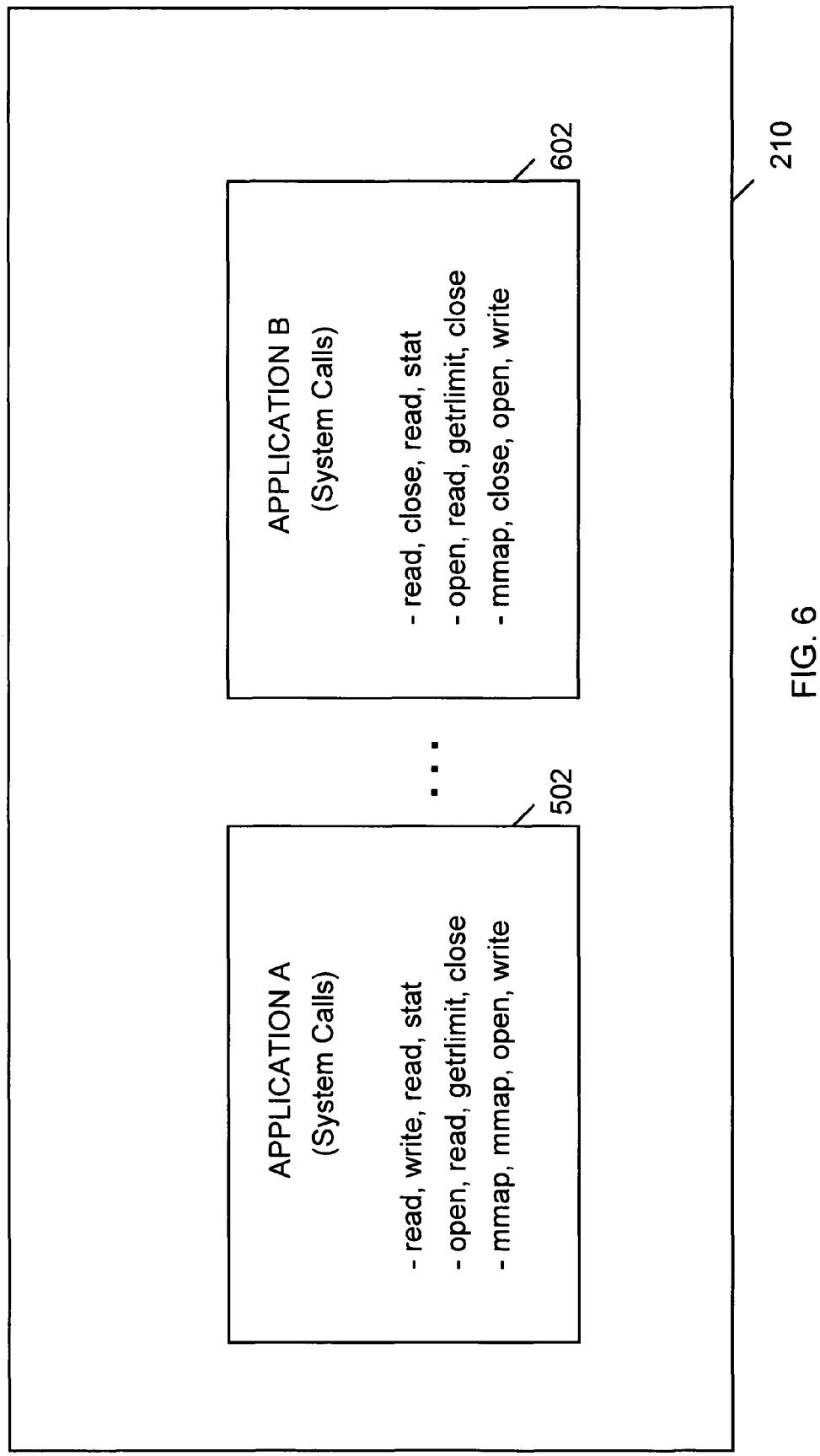
FIG. 6 is an illustration of various normal behavior profiles in the profile database, according to an embodiment of the present invention.

FIG. 6 is an illustration of various normal behavior profiles in the profile database, according to one embodiment of the present invention. FIG. 6 shows the behavior profile 502 of FIG. 5 in the behavior profile database 210. FIG. 6 also shows an additional behavior profile 602 in the behavior profile database 210. Note that the profile 602 corresponds to a particular application, i.e., "Application B." Also note that the profile 602 includes a separate sequence of system calls that have been determined, during profile creation, to be a normal sequence of functions for the particular application.

Figure 7:
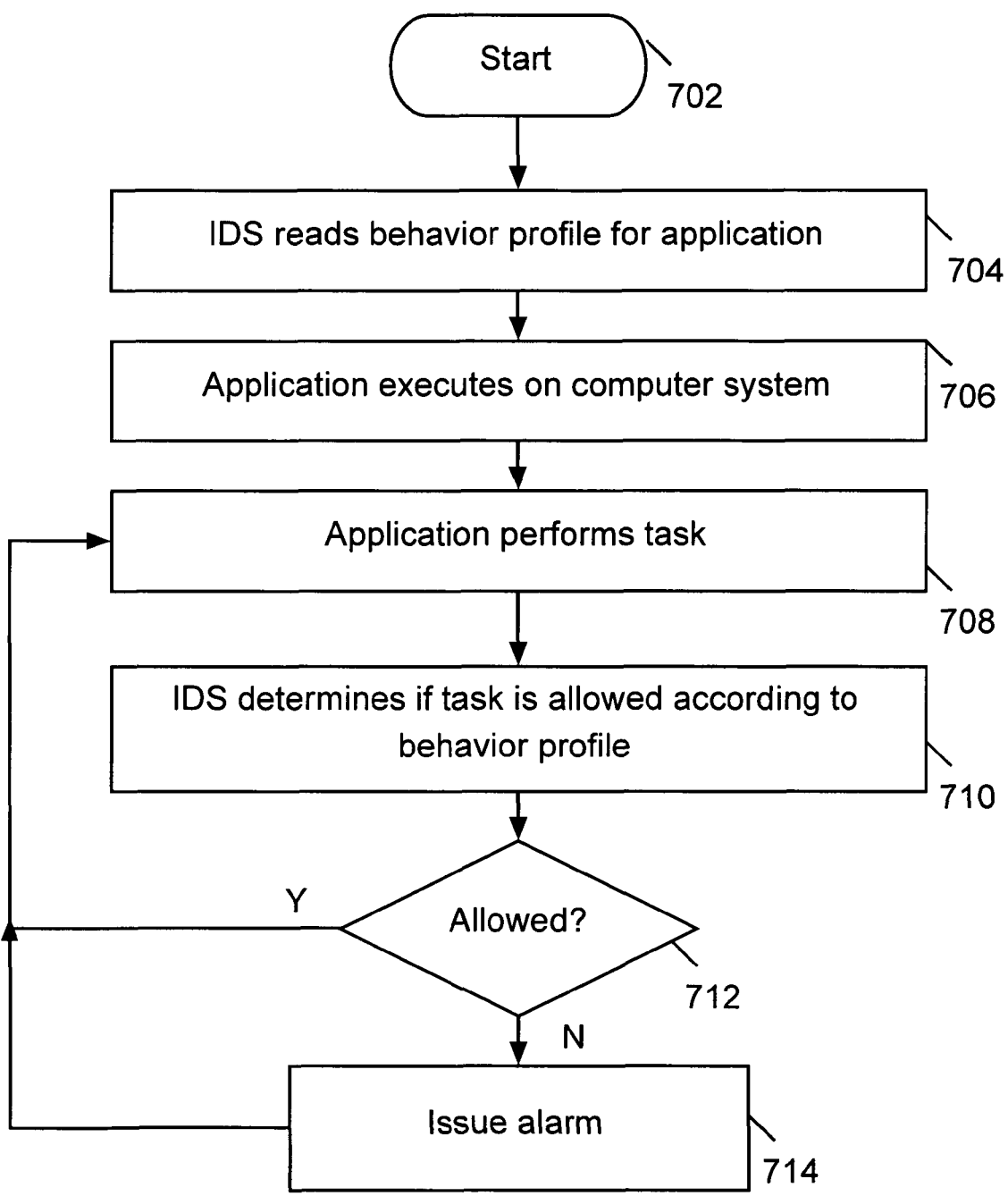
FIG. 7 is a flowchart depicting the operation and control flow of a monitoring process according to an embodiment of the present invention.

FIG. 7 is a flowchart depicting the operation and control flow of the monitoring process of one embodiment of the present invention. The operation and control flow of FIG. 7 provides more detail with regards to step 308 of FIG. 3. The operation and control flow of FIG. 7 begins with step 702 and proceeds directly to step 704.

In step 704, the IDS 202 reads the behavior profile, such as profile 214, for an application, such as application 204. In step 706, the application 204 executes on the computer system that the IDS 202 is monitoring. In step 708, the application 204 performs a task, such as a system read call. In step 710, the IDS 202 determines if the task is allowed according to the behavior profile 214. In step 712, ff the task is allowed according to the behavior profile 214, then the IDS 202 does nothing and control flows back to step 708. If the task is not allowed according to the behavior profile 214, then control flows to step 714.

In step 714, the IDS 202 issues an alarm indicating that the application 204 has attempted or performed a task not allowed by the profile 214. Alternatively, if the behavior of the application 204 does not conform to the behavior profile 214, then a log file describing how the application is not conforming to the behavior profile 214 is generated. In another alternative, if the behavior of the application 204 does not conform to the behavior profile 214, then the application 204 that is not conforming to the behavior profile 214 is discontinued or forcibly quit. In yet another alternative, if the behavior of the application 204 does not conform to the behavior profile 214, then the user is prompted to determine whether to quit the application 204 that is not conforming to the behavior profile 214.

Exemplary Implementations

The present invention can be realized in hardware, software, or a combination of hardware and software in client computers 102 through 104 of FIG. 1. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product (in client computers 102 through 104), which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 8:
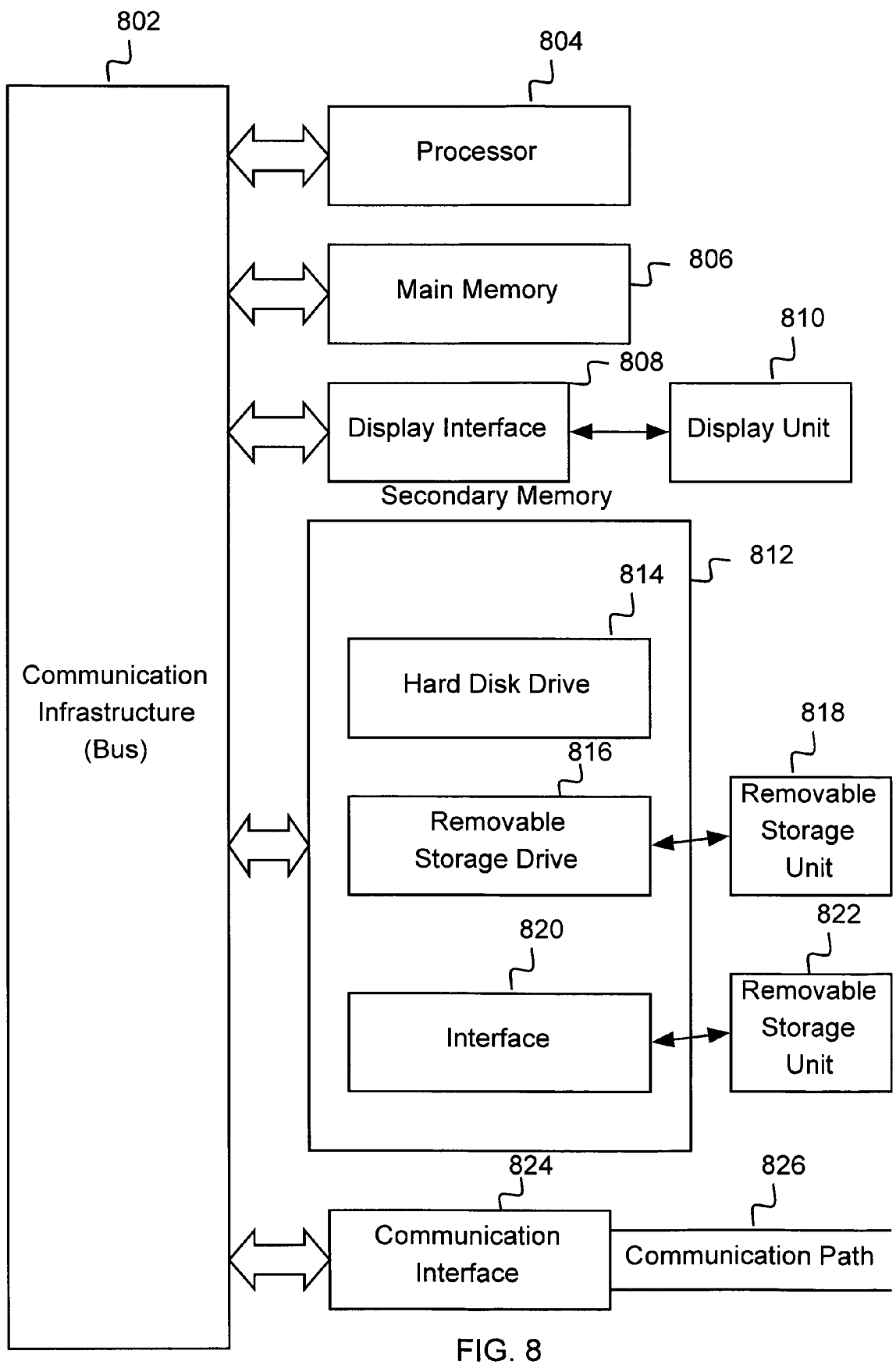
FIG. 8 is a block diagram of a computer system useful for implementing an embodiment of the present invention.

FIG. 8 is a block diagram of a computer system useful for implementing an embodiment of the present invention. The computer system of FIG. 8 is a more detailed representation of computers 102 through 104 or server 108. The computer system of FIG. 8 includes one or more processors, such as processor 804. The processor 804 is connected to a communication infrastructure 802 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 808 that forwards graphics, text, and other data from the communication infrastructure 802 (or from a frame buffer not shown) for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a manner well known to those having ordinary skill in the art. Removable storage unit 818, represents, for example, a floppy disk, magnetic tape, optical disk, etc. which is read by and written to by removable storage drive 816. As will be appreciated, the removable storage unit 818 includes a computer usable storage medium having stored therein computer software and/or data.

In alternative embodiments, the secondary memory 812 may include other similar means for allowing computer programs or other instructions to be loaded into the computer system. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 allows software and data to be transferred between the computer system and external devices. Examples of communications interface 824 may include a modem, a network interface (such as an Ethernet card), a communications port, a PCMCIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 806 and secondary memory 812, removable storage drive 816, a hard disk installed in hard disk drive 814, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 806 and/or secondary memory 812. Computer programs may also be received via communications interface 824. Such computer programs, when executed, enable the computer system to perform the features of the present invention as discussed herein. In particular, the computer programs, when executed, enable the processor 804 to perform the features of the computer system. Accordingly, such computer programs represent controllers of the computer system.

CONCLUSION

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method in a computer system for detecting intrusions during a bootstrapping phase of an intrusion detection system, the method comprising:
   storing a behavior profile associated with an application, the behavior profile having been generated prior to operation of the application on the computer system that detects intrusions during a bootstrapping phase of an intrusion detection system, wherein the stored behavior profile is cryptographically protected;
   reading, with the computer system during a bootstrapping phase of an intrusion detection system, the stored behavior profile associated with the application;
   monitoring execution of the application at the computer system during the bootstrapping phase, according to the behavior profile; and
   if the behavior of the application does not conform to the behavior profile, issuing a message indicating that the application is not conforming to the behavior profile.

2. The method of claim 1, where the application comprises any one of:
   a software program running on a computer system;
   a computer network;
   a user interfacing with a computer system;
   a plurality of computer systems; and
   a distributed application.

3. The method of claim 1, wherein the behavior profile is generated by at least one of:
   a developer of the method;
   a developer of the application; and
   a third party developer.

4. The method of claim 1, wherein the behavior profile is generated by any one of:
   executing the application on a reference computer system other than the computer system for detecting intrusions during a bootstrapping phase of an intrusion detection system;
   heuristic determination; and
   a combination of executing the application on the reference computer system and heuristic determination.

5. The method of claim 1, wherein the behavior profile includes at least one of:
   a list of system commands;
   a list of file permissions;
   a list of directory permissions;
   a list of network messages;
   a login attempt summary; and
   any measurable property of the system or application.

6. The method of claim 1, wherein the stored behavior profile is at least one of:
   encrypted; and
   digitally signed.

7. The method of claim 1, further comprising:
   if the behavior of the application does not conform to the behavior profile, generating a log file describing how the application is not conforming to the behavior profile.

8. The method of claim 1, further comprising:
   if the behavior of the application does not conform to the behavior profile, quitting the application that is not conforming to the behavior profile.

9. The method of claim 1, further comprising:
   if the behavior of the application does not conform to the behavior profile, prompting the user to determine whether to quit the application that is not conforming to the behavior profile.

10. A computer readable storage medium storing computer instructions for detecting intrusions during a bootstrapping phase of an intrusion detection system, the computer instructions including instructions for:
    storing a behavior profile associated with an application, the behavior profile having been generated prior to operation of the application on the computer system that detects intrusions during a bootstrapping phase of an intrusion detection system, wherein the stored behavior profile is cryptographically protected;
    reading, with the computer system during a bootstrapping phase of an intrusion detection system, the stored behavior profile associated with the application;
    monitoring execution of the application at the computer system during the bootstrapping phase, according to the behavior profile; and
    if the behavior of the application does not conform to the behavior profile, issuing a message indicating that the application is not conforming to the behavior profile.

11. The computer readable storage medium claim 10, where the application comprises any one of:
    a software program running on a computer system;
    a computer network;
    a user interfacing with a computer system;
    a plurality of computer systems; and
    a distributed application.

12. The computer readable storage medium of claim 11, wherein the behavior profile is generated by at least one of:
    a developer of the method;
    a developer of the application; and
    a third party developer.

13. The computer readable storage medium of claim 10, wherein the behavior profile is generated by any one of:
    executing the application on a reference computer system other than the computer system for detecting intrusions during a bootstrapping phase of an intrusion detection system;
    heuristic determination; and
    a combination of executing the application on the reference computer system and heuristic determination.

14. The computer readable storage medium of claim 10, wherein the behavior profile includes at least one of:
    a list of system commands;
    a list of file permissions;
    a list of directory permissions;
    a list of network messages;
    a login attempt summary; and
    any measurable property of the system or application.

15. The computer readable storage medium of claim 10, wherein the stored behavior profile is at least one of:
    encrypted; and
    digitally signed.

16. The computer readable storage medium of claim 10, further comprising:
    if the behavior of the application does not conform to the behavior profile, generating a log file describing how the application is not conforming to the behavior profile.

17. A computer system for detecting intrusions during a bootstrapping phase of an intrusion detection system, comprising:
    a first memory for storing an application;
    a second memory for storing a behavior profile associated with the application, the behavior profile having been generated prior to operation of the application on the computer system that detects intrusions during a bootstrapping phase of an intrusion detection system, wherein the stored behavior profile is cryptographically protected;
    a monitor, communicatively coupled with the first memory and the second memory, for
       reading, with the computer system during a bootstrapping phase of an intrusion detection system, the stored behavior profile associated with the application, and monitoring execution of the application at the computer system during the bootstrapping phase, according to the behavior profile; and a warning module, communicatively coupled with the monitor, for issuing a message indicating that the application is not conforming to the behavior profile.

18. The computer system of claim 17, wherein the behavior profile is generated by at least one of:
a developer of software for the monitor;
a developer of the application; and
a third party developer.

* * * * *